ns patent 3,397,217
SUBSTITUTED DITHIARSOLES AND
DITHIASTIBOLES
William Lindsay Mosby, North Plainfield, and Erwin
Klingsberg, Mountainside, N.J., assignors to American
Cyanamid Company, Stamford, Conn., a corporation
of Maine
No Drawing. Filed Aug. 3, 1965, Ser. No. 477,020
3 Claims. (Cl. 260—440)

ABSTRACT OF THE DISCLOSURE

This invention relates to organo-metallic derivatives represented by Formula I:

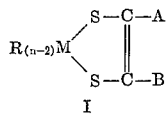

wherein M is a polyvalent metal selected from the group consisting of antimony, arsenic and tin; R is a monovalent hydrocarbyl radical selected from the group consisting of lower-alkyl, monocyclic and bicyclic aromatic, and monocyclic ar(lower-alkyl); $n$ is the valence of M; A and B are independently monovalent radicals selected from the group consisting of CN, COOR, $CONH_2$, CONHR, COR and $NO_2$; and when M is tin, A and B are selected from the group consisting of COOR, $CONH_2$, CONHR, COR and $NO_2$.

---

This invention relates to, and has as its object, the provision of new compounds. More particularly, it relates to organo-metallic derivatives of unsaturated, carbon-containing dithiols represented by the Formula I:

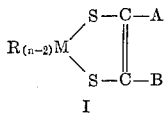

wherein M is a polyvalent metal selected from the group consisting of antimony, arsenic and tin; R is a monovalent hydrocarbyl radical selected from the group consisting of lower alkyl (including cycloalkyl of 4–6 carbons), monocyclic or bicyclic aromatic (e.g., phenyl and naphthyl as well as lower alkyl substituted analogs), and monocyclic ar(lower alkyl); $n$ is the valence of M; A and B are independently monovalent radicals selected from the group consisting of CN, COOR, $CONH_2$, CONHR, COR and $NO_2$.

The compounds of this invention exhibit biocidal properties. Thus, they are bacteriocidal, inhibiting the growth of *E. coli, Staph. aureus* and *B. mycoides;* fungicidal, inhibiting the growth of *Asper. niger, Fusarium moniliform* and *Penicillium citrium;* and herbicidal, killing wheat and radish seeds. Accordingly, they can be used agriculturally in conventional formulations as fungicides, herbicides and bacteriocides.

To prepare the compounds of this invention, as alkali metal 1,2-ethylenedithiolate is reacted with a metal dihalide as in the following equation:

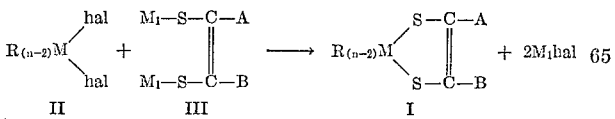

wherein R, M, A, B and $n$ are as defined above, "hal" is halogen of atomic number above 9, and $M_1$ is an alkali metal such as sodium or potassium. The reaction can be carried out by contacting approximately equimolar amounts of the dihalide and dithiolate in a suitable reaction medium.

Suitable inert reaction media include ethylene glycol, diethyl ether, acetonitrile, dimethylformamide, "Diglyme," dimethylacetamide, dimethylsulfoxide, etc.

When the two reactants are contacted, some heat is usually evolved. Therefore, it is unsually advantageous to combine the reactants at room temperature. Under certain conditions, it may be necessary to provide a cooling means to remove the heat of reaction. In a few cases, it may be necessary to apply heat to promote the completion of the reaction. Temperatures between room temperature and the boiling point of the reaction medium may be used. The reactions are rapid and usually require only a short time for completion.

The reaction products may be isolated by any convenient means. It is advantageous to add water, when a water-miscible reaction medium has been used, whereupon the product precipitates, if it is not already precipitated.

Suitable dithiolates are alkali metal derivatives of 1,2-ethylenedithiols such as 1,2-dimercapto-1,2-dicyanoethylene, 1,2-dimercapto-1,2-dicarbamoylethylene, 1,2-dimercapto-2-cyano-1-carbamoylethylene, 1,2 - dimercapto-1,2-diacetylethylene, 1,2-dimercapto-2-nitroethylene and 1,2-dimercapto-1-carbethoxy-2-(N - 1 - naphthylcarbamoyl)-ethylene.

Five types of organo-metallic dihalides may be used in the preparation of the compounds of this invention. They are shown in the following general formulae:

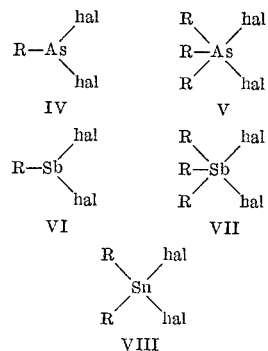

Accordingly, five main types of compounds of Formula I can be obtained by varying the particular dihalide which is reacted with the dithiolate. The types are shown in the following formulae:

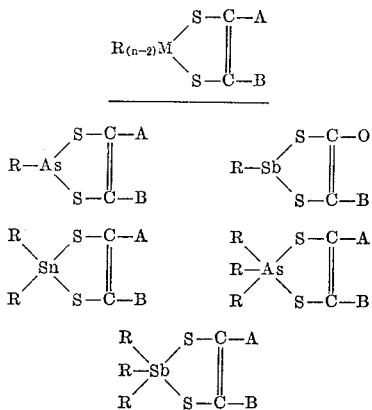

Representative organo dihalides of trivalent arsenic in Formula IV are alkyl- and aryl-dihaloarsines, such as methyldichloroarsine, methyldiiodoarsine, methyldibromoarsine, ethyldibromoarsine, amyldibromoarsine, heptyldichloroarsine, trifluoromethyldibromoarsine, ethoxyethyldichloroarsine, phenyldibromoarsine, phenyldiiodoarsine, phenyldichloroarsine, o-tolyldichloroarsine, 2-naphthyldichloroarsine, p-chlorophenyldichloroarsine, m-nitrophenyldichloroarsine, 2,5 - dimethylphenyldichloroarsine, 4-acetamidophenyldichloroarsine, benzyldichloroarsine, etc.

Representative organo dihalides of pentavalent arsenic in Formula V are trialkyl- and triaryl-dihaloarsenic compounds, such as trimethyldichloroarsenic, trimethyldibromoarsenic, triethyldiiodoarsenic, diethylphenyldichloroarsenic, diphenylethyldichloroarsenic, ethylphenyl-p-tolyldichloroarsenic, triphenyldichloroarsenic, tri-p-tolyldichloroarsenic, tri-1-naphthyldichloroarsenic, etc.

Representative organo dihalides of trivalent antimony in Formula VI are alkyl- and aryl-dihalostibines, such as methyldichlorostibine, ethyldichlorostibine, phenyldiiodostibine, p-nitrophenyldichlorostibine, p-tolyldichlorostibine, p - ethylphenyldichlorostibine, 2 - naphthyldichlorostibine, etc.

Representative organo dihalides of pentavalent antimony in Formula VII are trialkyl- and triaryldihaloantimony compounds, such as trimethyldibromoantimony, trimethyldichloroantimony, triphenyldibromoantimony, triphenyldichloroantimony, triphenyldiiodoantimony, tris-p-chlorophenyldichloroantimony, tri-2,4-xylyldichloroantimony, tri-1-naphthyldibromoantimony, etc.

Representative organo-tin dihalides of Formula VIII are dialkyl- and diaryl-dihalo-tin compounds such as dimethyldichlorotin, diethyldibromotin, dibutyldibromotin, diamyldichlorotin, dioctyldichlorotin, didecyldichlorotin, butylpropyldichlorotin, diphenyldiiodotin, di-p-tolyldichlorotin, bis(p-methoxyphenyl)dichlorotin, dibenzyldiiodotin, dicyclohexyldichlorotin, etc.

The following examples in which parts and percentages are by weight, are presented to further illustrate the present invention.

Example 1.—2,2-dibutyl-4,5-dicyano-1,3,2-dithiastannole

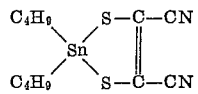

A mixture of 3.72 parts (0.02 mole) of disodium dimercaptomalonitrile and 6.08 parts (0.02 mole) of dibutyldichlorotin is triturated in about 10 parts of acetonitrile while slowly heating to the boil. After adding water, the precipitate is separated by filtration, washed with methanol, and recrystallized from nitromethane. The product melts at 165–167° C. with decomposition.

Example 2.—4,5-dicyano-2-phenyl-1,3,2-dithiarsole

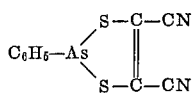

A solution of 21.7 parts (0.05 mole) of phenyldiiodoarsine in about 25 parts of dimethoxymethane is slowly added to a refluxing solution of 13.0 parts (0.07 mole) of disodium dimercaptomalonitrile in about 110 parts of dimethoxymethane. The precipitate is separated by filtration, washed with water and recrystallized from dimethoxymethane. The product melts at 131–132° C.

Example 3.—4,5-dicyano-2,2-diphenyl-1,3,2-dithiastannole

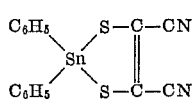

A mixture of 3.72 parts (0.02 mole) of disodium dimercaptomalonitrile and 6.88 parts (0.02 mole) of diphenyldichlorotin is triturated in about 10 parts of acetonitrile while slowly heating to the boil. After adding water, the precipitate is triturated with water, separated by filtration, washed with water and a little methanol, and recrystallized from benzene. The product melts at about 210–230° C. with decomposition.

Example 4.—4,5-dicyano-2,2,2-triphenyl-1,3,2-dithiastibole

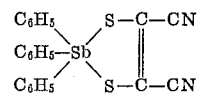

A mixture of 0.93 part (0.005 mole) of disodium dimercaptomalonitrile and 2.12 parts (0.005 mole) of triphenyldichloroantimony is triturated at 25–30° C. in about five parts of ethylene glycol dimethyl ether. A dark red solution is formed from which a precipitate separates in a few minutes. Water is added and the insoluble material is separated by filtration, washed successively with water, methanol and ether, and finally recrystallized successively from ethyl acetate and benzene. The product melts at 171–172° C.

Example 5.—2,2-dibutyl-4,5-dinitro-1,3,2-dithiastannole

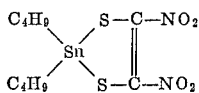

A mixture of 3.04 parts (0.01 mole) of dibutyldichlorotin and 2.13 parts (0.01 mole) of dipotassium 1,2-dinitro-1,2-ethylenedithiol is triturated in about two parts of dimethylformamide. Water is added. The precipitated product is separated by filtration, and washed with water, methyl alcohol and ethyl acetate.

Example 6.—4,5-dicyano-2,2,2-trimethyl-1,3,2-dithiarsole

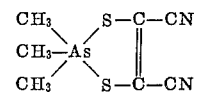

Following the procedure of Example 2 except for the use of an equimolar amount of trimethyldibromoarsenic as the dihalide, the above product is obtained.

Example 7.—2,2-dibenzyl-4,5-dicyano-1,3,2-dithiastannole

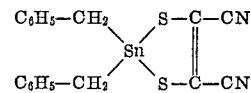

Following the procedure of Example 1 except for the use of an equimolar amount of dibenzyldibromotin as the dihalide, the above product is obtained.

Example 8.—4,5-dicyano-2-(2-naphthyl)-1,3,2-dithiastibole

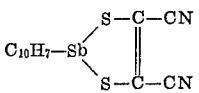

Following the procedure of Example 1 except for the use of an equimolar amount of 2-naphthyldichloroantimony as the dihalide, the above product is obtained.

Example 9.—4,5-bis(ethoxycarbo)2,2-diphenyl-1,3,2-dithiastannole

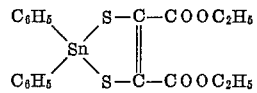

This product is obtained by reacting sodium 1,2-bis-(ethoxycarbo) - 1,2 - ethylenedithiolate in the manner of Example 3.

Example 10.—4,5-dicarbamoyl-2-methyl-1,3,2-dithiastibole

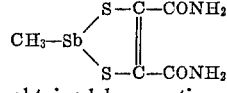

The product is obtained by reacting sodium 1,2-dicarbamoyl-1,2-ethylenedithiol with methyldichlorostibine in the manner of Example 1.

Example 11.—4,5-diacetyl-2,2,2-triphenyl-1,3,2-arsole

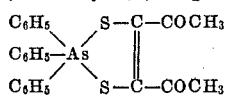

This product is obtained by reacting sodium 1,2-diacetyl-1,2-ethylenedithiol with triphenyldichloroarsenic in the manner of Example 1.

We claim:
1. A compound of the formula:

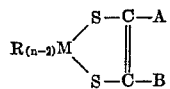

wherein M is a polyvalent metal selected from the group consisting of antimony and arsenic; R is a monovalent hydrocarbyl radical selected from the group consisting of lower alkyl, monocyclic and bicyclic aromatic, and monocyclic ar(lower alkyl); $n$ is the valence of M; A and B are independently monovalent radicals selected from the group consisting of CN, COOR, CONH$_2$, CONHR, COR and NO$_2$.

2. The compound 4,5 - dicyano-2-phenyl-1,3,2-dithiarsole.

3. The compound 4,5-dicyano-2,2,2-triphenyl-1,3,2-dithiastibole.

References Cited
UNITED STATES PATENTS

| | | | |
|---|---|---|---|
| 3,035,052 | 5/1962 | Friedheim | 260—440 X |
| 3,311,647 | 3/1967 | Stamm | 260—429.7 |
| 3,317,573 | 5/1967 | Stamm | 260—429.7 |
| 3,317,575 | 5/1967 | Breindel et al. | 260—440 |

TOBIAS E. LEVOW, *Primary Examiner.*

W. F. W. BELLAMY, *Assistant Examiner.*